(12) United States Patent
Iwasaki et al.

(10) Patent No.: US 8,359,425 B2
(45) Date of Patent: Jan. 22, 2013

(54) MEMORY CONTROL DEVICE, MEMORY DEVICE, AND SHUTDOWN CONTROL METHOD

(75) Inventors: Kiyotaka Iwasaki, Kawasaki (JP); Hirotaka Suzuki, Oume (JP); Tohru Fukuda, NishiTokyo (JP); Motohiro Matsuyama, Hino (JP); Yoshimasa Aoyama, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 24 days.

(21) Appl. No.: 13/086,240

(22) Filed: Apr. 13, 2011

(65) Prior Publication Data

US 2012/0011303 A1    Jan. 12, 2012

(30) Foreign Application Priority Data

Jul. 9, 2010  (JP) ................................. 2010-157018

(51) Int. Cl.
*G06F 13/00* (2006.01)
(52) U.S. Cl. ............. 711/103; 711/156; 710/32; 710/59
(58) Field of Classification Search .................. 711/103, 711/156; 710/32, 59
See application file for complete search history.

(56) References Cited

U.S. PATENT DOCUMENTS

| | | | |
|---|---|---|---|
| 6,370,638 B1 | 4/2002 | Yamasaki | |
| 6,490,664 B1 * | 12/2002 | Jones et al. | 711/154 |
| 7,072,232 B2 | 7/2006 | Shiota et al. | |
| 7,280,416 B2 | 10/2007 | Shiota et al. | |
| 7,596,041 B2 | 9/2009 | Shiota et al. | |
| 7,725,694 B2 | 5/2010 | Ito et al. | |
| 2004/0158778 A1 | 8/2004 | Shiota et al. | |
| 2006/0155976 A1 | 7/2006 | Ito et al. | |
| 2006/0239086 A1 | 10/2006 | Shiota et al. | |
| 2008/0137452 A1 | 6/2008 | Shiota et al. | |
| 2009/0070602 A1 | 3/2009 | Ingle et al. | |

FOREIGN PATENT DOCUMENTS

| | | |
|---|---|---|
| JP | H01-283656 | 11/1989 |
| JP | H05-314063 | 11/1993 |
| JP | H11-219294 | 8/1999 |
| JP | 2000-076737 | 3/2000 |
| JP | 2002-099348 | 4/2002 |
| JP | 2004-240820 A | 8/2004 |
| JP | 2006-309454 | 11/2006 |

(Continued)

OTHER PUBLICATIONS

Notice of Rejection mailed by the Japan Patent Office on Jun. 7, 2011 in corresponding Japanese patent app. No. 2010-157018 in 5 pages.
Decision to Grant a Patent mailed by the Japan Patent Office on Aug. 23, 2011 in corresponding Japanese app. No. 2010-157018 in 3 pages.

*Primary Examiner* — Kalpit Parikh
(74) *Attorney, Agent, or Firm* — Knobbe, Martens, Olson & Bear LLP

(57) ABSTRACT

According to one embodiment, a memory control device includes a controller, a command queue module, a plurality of stage processors, and a skip module. The controller controls a data access command to a nonvolatile memory from a host. The command queue module queues a transfer request command corresponding to the data access command. The stage processors each perform stage processing related to the transfer request command queued by the command queue module. The skip module skips the stage processing by the stage processors in response to a shutdown command from the controller.

12 Claims, 8 Drawing Sheets

FOREIGN PATENT DOCUMENTS

| | | |
|---|---|---|
| JP | 2007-310905 | 11/2007 |
| JP | 2008-077468 A | 4/2008 |
| JP | 2009-043044 | 2/2009 |
| JP | 2010-079693 | 4/2010 |
| JP | 2010-538398 | 12/2010 |
| WO | WO 2009/032936 A | 3/2009 |

* cited by examiner

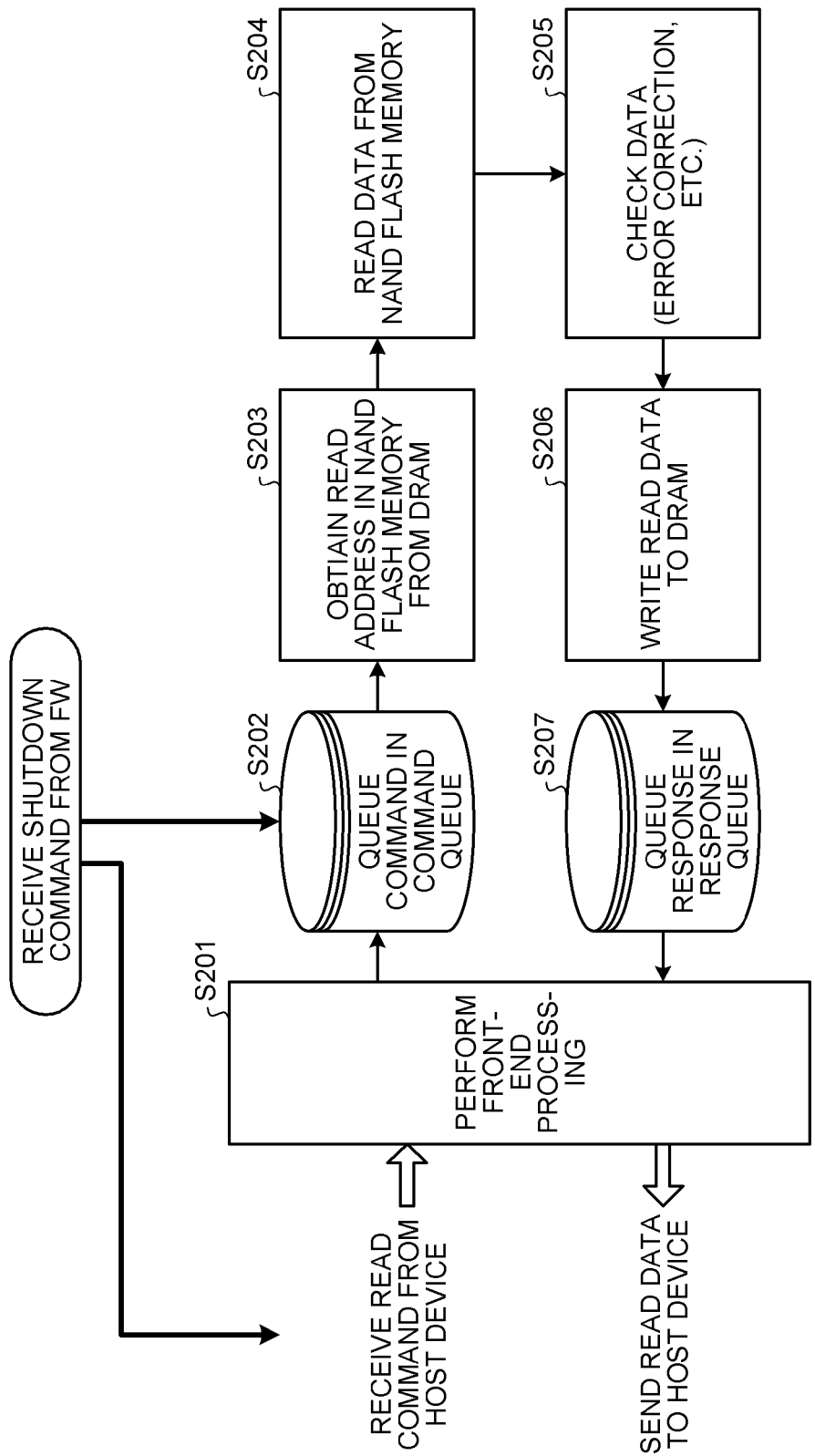

MEMORY CONTROL DEVICE, MEMORY DEVICE, AND SHUTDOWN CONTROL METHOD

CROSS-REFERENCE TO RELATED APPLICATIONS

This application is based upon and claims the benefit of priority from Japanese Patent Application No. 2010-157018, filed Jul. 9, 2010, the entire contents of which are incorporated herein by reference.

FIELD

Embodiments described herein relate generally to a memory control device, a memory device, and a shutdown control method.

BACKGROUND

There have been known solid state drive (SSD) devices with an SSD controller that controls data access to NAND flash memory in response to a command from a host.

When a shutdown command such as an emergency shutdown command is issued due to power failure, this type of SSD device takes some time to shut down.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIGS. 7 and 8 are exemplary schematic diagrams for explaining a specific operation of a conventional SSD device.

DETAILED DESCRIPTION

In general, according to one embodiment, a memory control device comprises a controller, a command queue module, a plurality of stage processors, and a skip module. The controller is configured to control a data access command to a nonvolatile memory from a host. The command queue module is configured to queue a transfer request command corresponding to the data access command. The stage processors are each configured to perform stage processing related to the transfer request command queued by the command queue module. The skip module is configured to skip the stage processing by the stage processors in response to a shutdown command from the controller.

According to another embodiment, a memory device comprises a nonvolatile memory, a controller, a command queue module, a plurality of stage processors, and a skip module. The nonvolatile memory is configured to store data. The controller is configured to control a data access command to the nonvolatile memory from a host. The command queue module is configured to queue a transfer request command corresponding to the data access command. The stage processors are each configured to perform stage processing related to the transfer request command queued by the command queue module. The skip module is configured to skip the stage processing by the stage processors in response to a shutdown command from the controller.

According to still another embodiment, there is provided a shutdown control method comprising: controlling, by a controller, a data access command to a nonvolatile memory from a host; queuing, by a command queue module, a transfer request command corresponding to the data access command; performing, by a plurality of stage processors, stage processing related to the transfer request command queued by the command queue module; and skipping, by a skip module, the stage processing by the stage processors in response to a shutdown command from the controller.

Various embodiments will be described hereinafter with reference to the accompanying drawings.

In the following embodiments, the memory control device, the memory device, and the shutdown control method will be described as being applied to a solid state drive (SSD) device connected to a personal computer (PC) as a host device.

Figure 1:
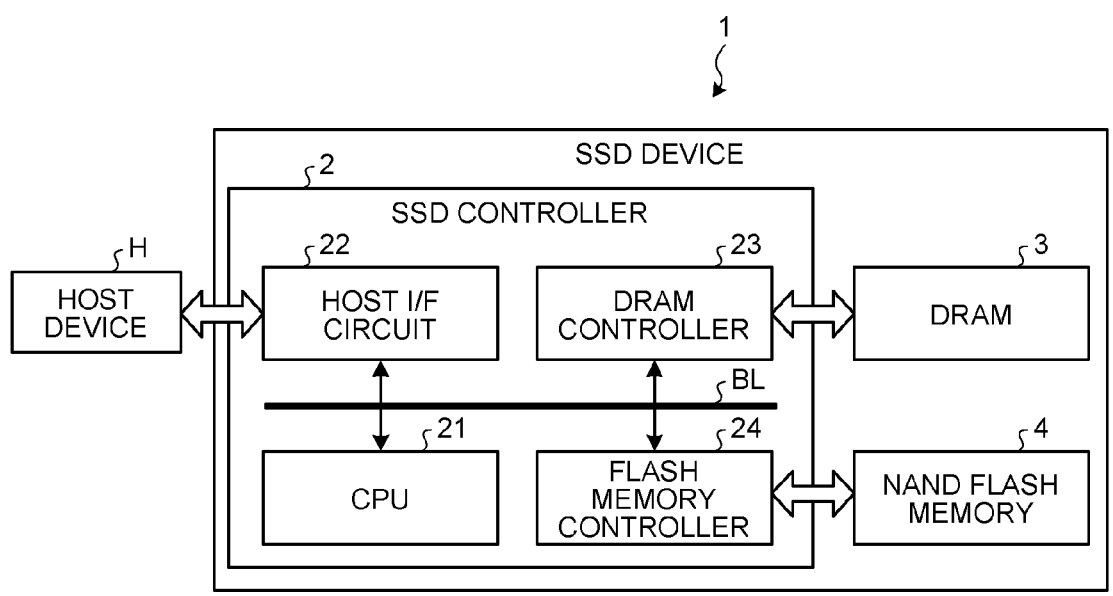
FIG. 1 is an exemplary block diagram of a solid state drive (SSD) device according to an embodiment.

FIG. 1 is a block diagram of an SSD device 1 according to an embodiment.

As illustrated in FIG. 1, the SSD device (memory device) 1 functions as an external memory of a host device H such as PC. The SSD device 1 comprises an SSD controller (memory controller) 2, a dynamic random access memory (DRAM) 3, and a NAND flash memory (nonvolatile memory) 4.

The SSD controller 2 comprises a central processing unit (CPU) 21 as a controller, a host interface (I/F) circuit 22, a DRAM controller 23, and a flash memory controller 24, which are connected by a bus line BL to allow data communication among them. The SSD controller 2 is generally referred to as system-on-a-chip (SoC).

The CPU 21 controls the host I/F circuit 22, the DRAM controller 23, and the flash memory controller 24. The CPU 21 is a controller that controls data access commands such as a write command and a read command to the NAND flash memory 4 from the host device H.

The host I/F circuit 22 is a circuit having the function of communicably connecting to the host device H.

The DRAM controller 23 is a circuit having the function of controlling data access such as write/read access to the DRAM 3.

The flash memory controller 24 is a circuit having the function of controlling data access such as write/read access to the NAND flash memory 4.

The DRAM 3 is a volatile memory that temporarily stores data to be written to the NAND flash memory 4 and data read from the NAND flash memory 4 to be sent to the host device H.

The NAND flash memory 4 is a nonvolatile memory that can retain the stored information even when not powered.

Incidentally, the transfer rate of the NAND flash memory 4 differs from that of the host device H. Therefore, upon receipt of a write command to the NAND flash memory 4 from the host device H, the SSD device 1 handles the write command as a transfer request command to transfer write data, which has been received from the host device H and temporarily stored in the DRAM 3, from the DRAM 3 to the NAND flash memory 4.

On the other hand, because of the difference in transfer rate, upon receipt of a read command to the NAND flash memory 4 from the host device H, the SSD device 1 handles the read command as a transfer request command to transfer read data, which has been read from the NAND flash memory 4 and temporarily stored in the DRAM 3, from the DRAM 3 to the host device H.

When the SSD device 1 is activated, a boot program stored in a boot read only memory (ROM) (not illustrated) is loaded into the DRAM 3 or the like, and thus the CPU 21 executes firmware (FW).

The FW performs various functions of analyzing a command from the host device H, sending a transfer request command to the flash memory controller 24, logical block address (LBA) redundancy check, compaction, patrol, error recovery, statistical information measurement, and the like.

Figure 2:
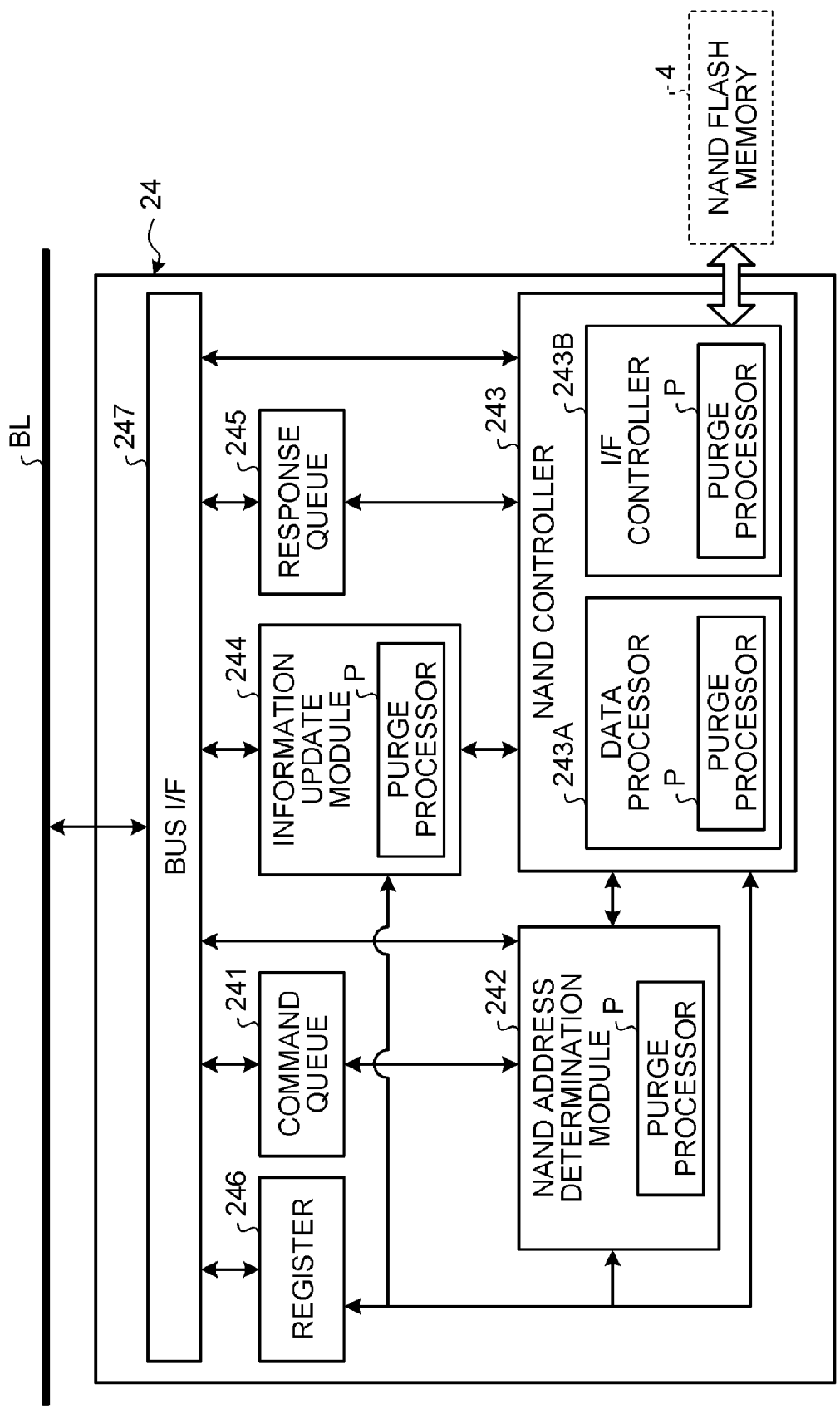
FIG. 2 is an exemplary detailed block diagram of a flash memory controller illustrated in FIG. 1 in the embodiment.

FIG. 2 is a detailed block diagram of the flash memory controller 24 illustrated in FIG. 1.

As illustrated in FIG. 2, the flash memory controller 24 comprises a command queue (command queue module) 241, a NAND address determination module (stage processor) 242, a NAND controller (stage processor) 243, an information update module (stage processor) 244, a response queue (response queue module) 245, a register 246, and a bus I/F 247. The modules 241 to 247 are connected to the bus line BL via the bus I/F 247 so that data is communicable.

The command queue 241 is an internal buffer to queue transfer request commands corresponding to write commands or read commands from the host device H.

The NAND address determination module 242 is a stage processor that performs stage processing related to a transfer request command queued in the command queue 241. The NAND address determination module 242 is a circuit that determines an address of the NAND flash memory 4 for data access based on information contained in the transfer request command.

The NAND controller 243 is a stage processor that performs stage processing related to a transfer request command queued in the command queue 241. The NAND controller 243 is a circuit that performs data access such as data write/read access to the NAND flash memory 4. The NAND controller 243 comprises a data processor (stage processor) 243A and an I/F controller (stage processor) 243B. The data processor 243A performs data processing such as randomization and error correction such as error correcting code assignment. The I/F controller 243B makes access to the NAND flash memory 4.

The information update module 244 is a stage processor that performs stage processing related to a transfer request command queued in the command queue 241. The information update module 244 is a circuit that updates various types of information including access history information and address information managed by an information table (not illustrated) stored in the DRAM 3. The address information indicates an address of the NAND flash memory 4 at which write data from the host device H is stored or at which read data to be sent to the host device H is stored.

The NAND address determination module 242, the data processor 243A and the I/F controller 243B of the NAND controller 243, and the information update module 244 each comprise a purge processor (skip module) P. Upon receipt of a shutdown command from the CPU 21 (FW), the purge processor P skips and does not perform the stage processing Upon receipt of a notification from the register 246, which will be described later, the purge processor P performs purge processing to skip the stage processing by each stage processor related to a transfer request command fetched (dequeued) from the command queue 241 in the flash memory controller 24 and currently being executed. In the purge processing, the purge processor P assigns a purge flag to the transfer request command currently being executed and outputs it to the stage processors at the latter stage as well as sending a transfer request command already assigned a purge flag to the stage processors at the latter stage.

The response queue 245 is an internal buffer to queue a response indicating the processing result of a transfer request from the host device H, especially, in the embodiment, a response indicating the processing result of a transfer request command skipped by the purge processor (skip module) P.

The register 246 is a circuit that, when the flash memory controller 24 receives a shutdown command from the CPU 21 (FW), stores information thereon and notifies the purge processor P of the shutdown command.

The bus I/F 247 is a circuit having the function of communicably connecting to the bus line BL.

Although not illustrated, the SSD device 1 of the embodiment comprises a notification module that, when detecting that all transfer request commands being executed are skipped by the stage processors, notifies the CPU 21 (FW) that the purge processing is completed in the flash memory controller 24 with information on the skipped transfer request commands.

That is, in the SSD device 1 of the embodiment, when the flash memory controller 24 receives a shutdown command from the CPU 21 (FW) due to power failure or the like, the purge processor P performs the purge processing to skip the stage processing by each stage processor related to a transfer request command fetched (dequeued) from the command queue 241 in the flash memory controller 24 and currently being executed. More specifically, the purge processor P assigns a purge flag to the transfer request command currently being executed and outputs it to the stage processors at the latter stage as well as sending a transfer request command already assigned a purge flag to the stage processors at the latter stage.

After that, in the SSD device 1 of the embodiment, a response indicating the skip by the purge processor P is queued in the response queue 245, and the CPU 21 (FW) is notified of it. Then, the SSD device 1 is shut down.

With reference to FIGS. 3 to 6, a description will be given of a specific operation of the flash memory controller 24 configured as above.

Figure 3:
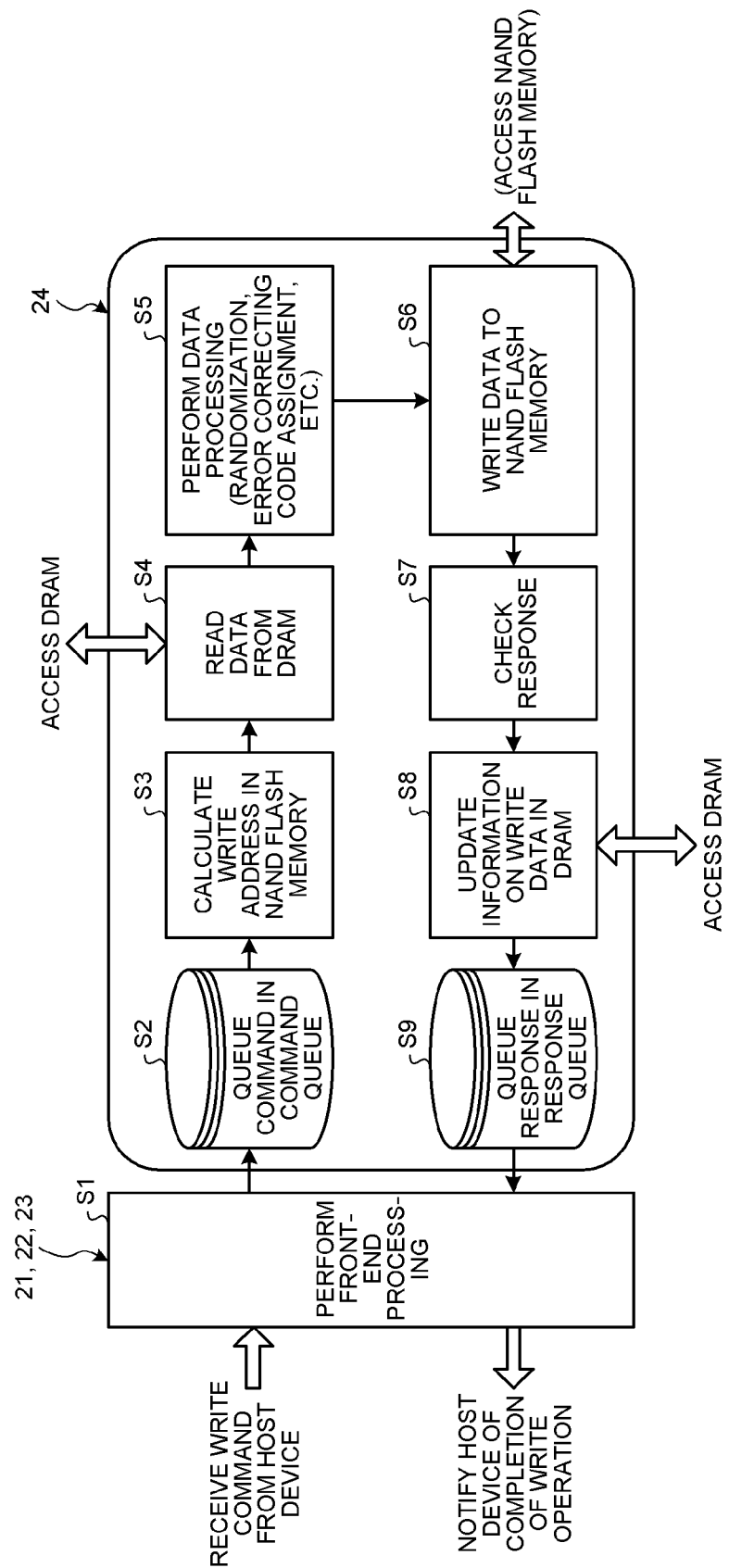
FIGS. 3 to 6 are exemplary schematic diagrams for explaining a specific operation of the SSD device in the embodiment.

FIG. 3 is a diagram for explaining an operation flow of the flash memory controller 24 to execute a transfer request command corresponding to a write command from the host device H.

As illustrated in FIG. 3, when the SSD controller 2 of the SSD device 1 receives a write command from the host device H, first, the CPU 21, the host I/F circuit 22, and the DRAM controller 23 perform front-end processing such as command analysis at S1.

Then, at S2, the command queue 241 queues a transfer request command corresponding to the analyzed write command, and the DRAM controller 23 temporarily stores write data in the DRAM 3.

The CPU 21 sequentially fetches (dequeues) transfer request commands from the command queue 241 and executes them.

More specifically, at S3, the NAND address determination module 242 determines a write address in the NAND flash memory 4 as the stage processing related to a transfer request command fetched (dequeued) by the CPU 21.

At S4, under the control of the CPU 21, the DRAM controller 23 reads the write data temporarily stored in the DRAM 3.

At S5, the data processor 243A of the NAND controller 243 performs data processing such as randomization and error correction such as error correcting code assignment on the write data.

At S6, the I/F controller 243B of the NAND controller 243 writes the write data to the NAND flash memory 4.

After completion of writing the write data, the NAND flash memory 4 returns a response. At S7, the NAND controller 243 checks the response. At S8, the information update module 244 updates information in the DRAM 3, i.e., information that uniquely identifies the write data received from the host device H and the address in the NAND flash memory 4 to which the write data is written.

At S9, the response indicating processing results as to whether the write data is written to the NAND flash memory 4 properly and the like is queued in the response queue 245. Thus, the operation flow of the flash memory controller 24 ends.

After that, returning to S1, the CPU 21 sequentially fetches (dequeues) responses from the response queue 245, and performs front-end processing. The CPU 21 then notifies the host device H of the completion of the write command. Thus, the process in the SSD controller 2 ends.

Figure 4:
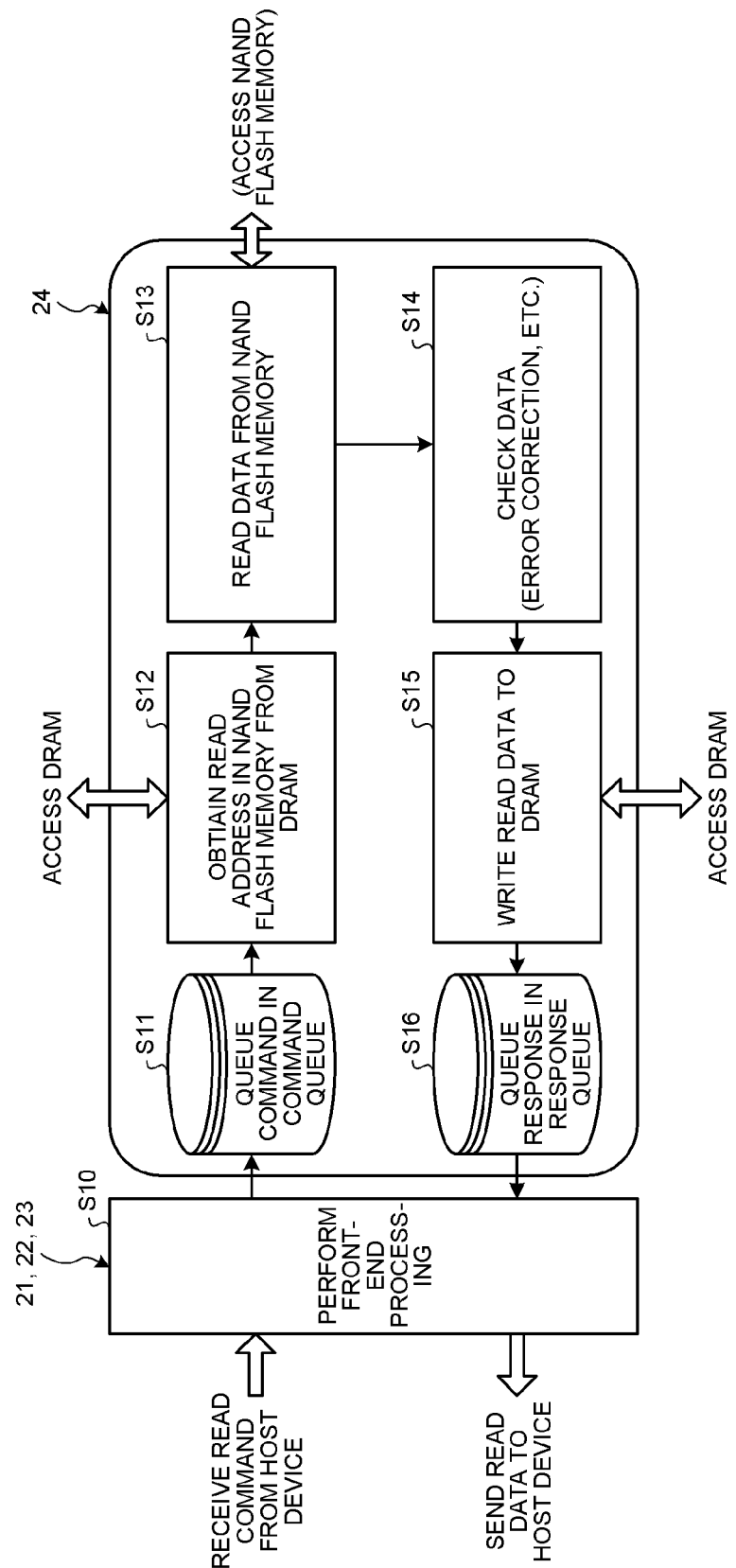

FIG. 4 is a diagram for explaining an operation flow of the flash memory controller 24 to execute a transfer request command corresponding to a read command from the host device H.

As illustrated in FIG. 4, when the SSD controller 2 of the SSD device 1 receives a read command from the host device H, first, the CPU 21, the host I/F circuit 22, and the DRAM controller 23 perform front-end processing such as command analysis at S10.

Then, at S11, the command queue 241 queues a transfer request command corresponding to the analyzed read command.

The CPU 21 sequentially fetches (dequeues) transfer request commands from the command queue 241 and executes them.

More specifically, at S12, under the control of the CPU 21, the DRAM controller 23 reads information as to an address where read data to be read is written in the NAND flash memory 4 from the DRAM 3. Incidentally, the information corresponds to the information written at S8 in FIG. 3.

At S13, the I/F controller 243B of the NAND controller 243 reads the read data from the NAND flash memory 4 based on the information read at S12.

After completion of reading the read data, at S14, the data processor 243A of the NAND controller 243 performs data check such to check an error correcting code added upon write operation, to restore randomized data, and the like.

At S15, under the control of the CPU 21, the DRAM controller 23 writes the read data to the DRAM 3. At S16, a response indicating the results of the read operation is queued in the response queue 245. Thus, the operation flow of the flash memory controller 24 ends.

After that, returning to S10, the CPU 21 sequentially fetches (dequeues) responses from the response queue 245, and performs front-end processing. The CPU 21 then notifies the host device H of the completion of the read command. Thus, the process in the SSD controller 2 ends.

Figure 5:
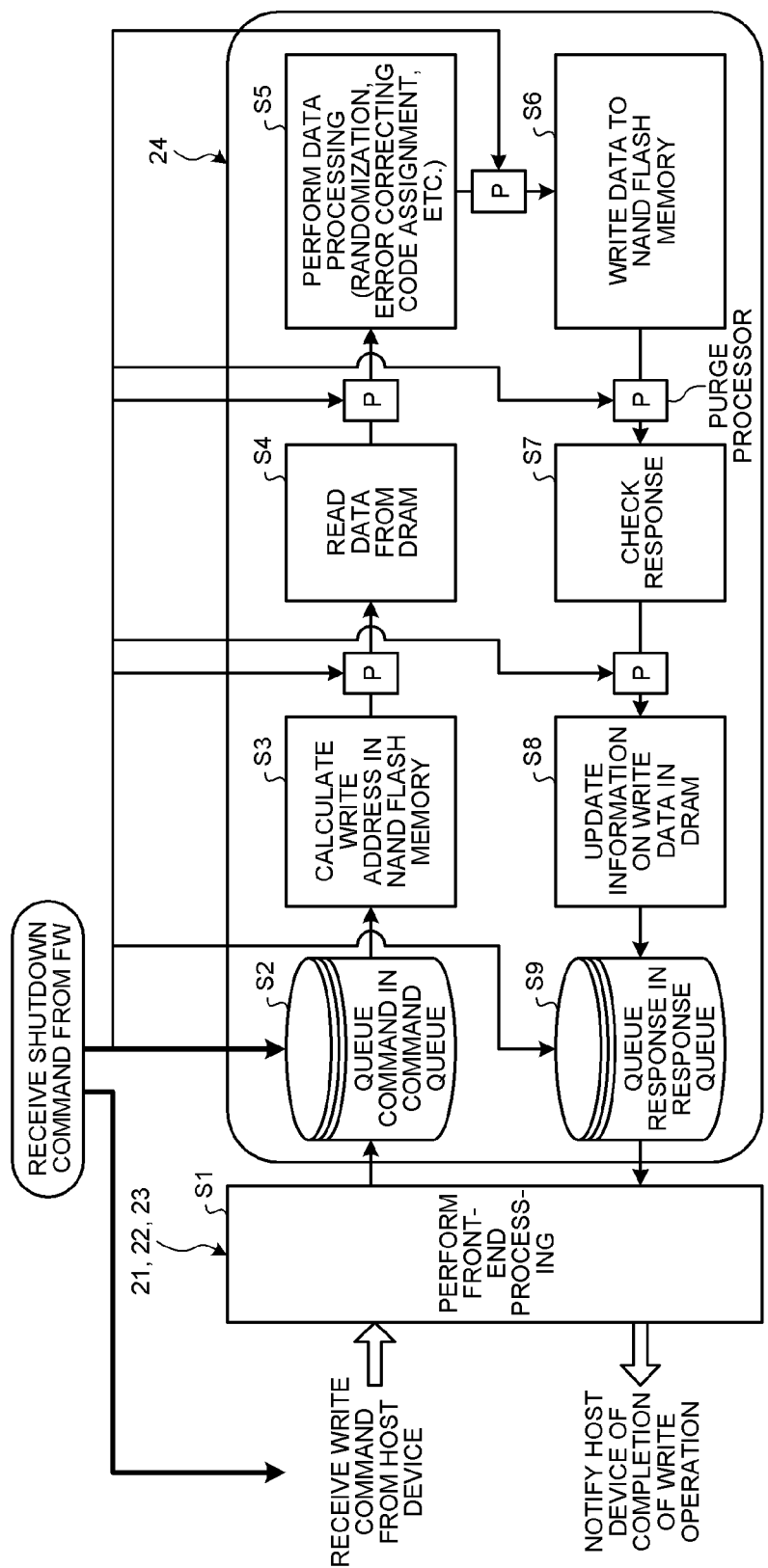
Figure 6:
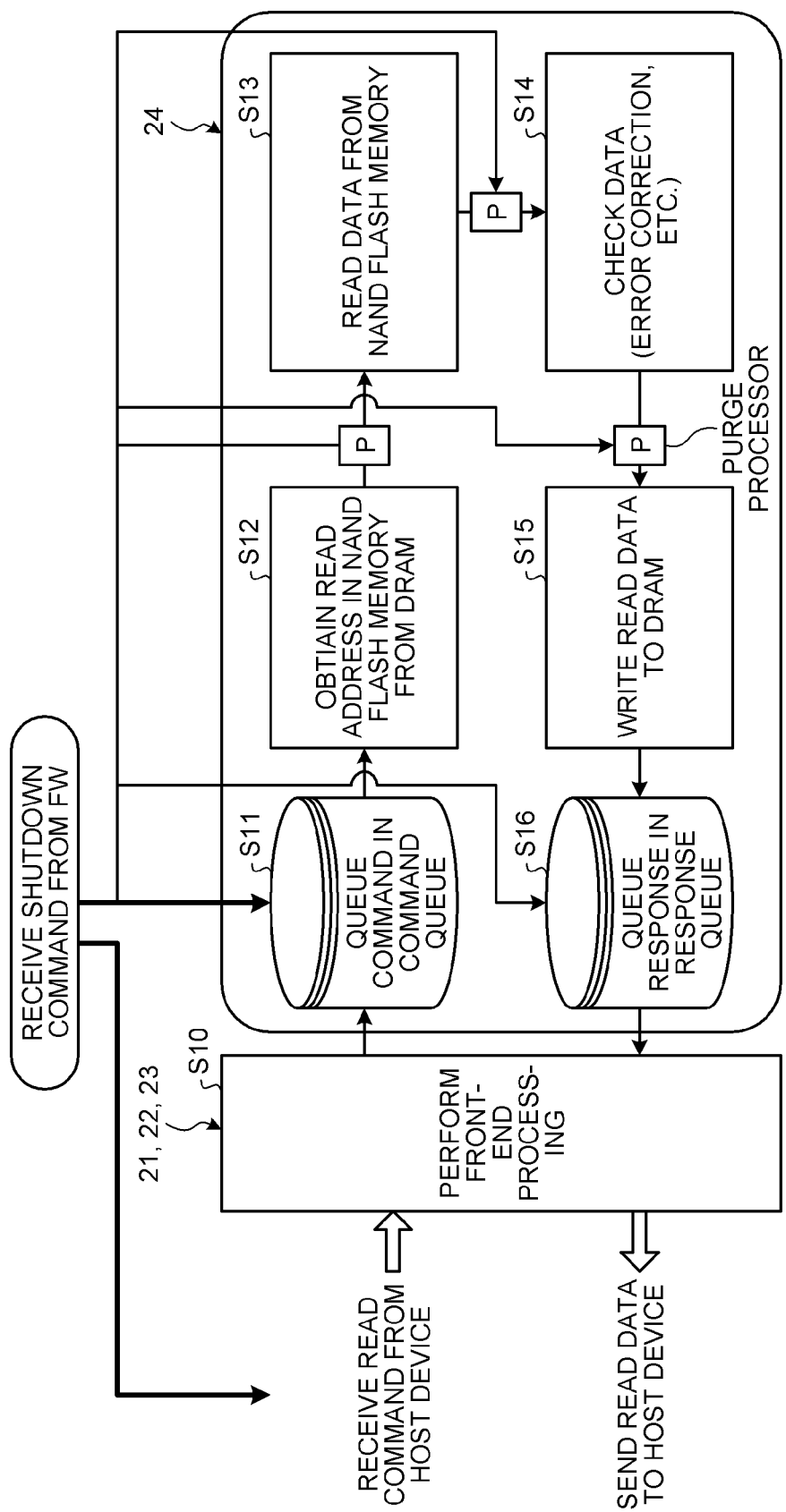

FIGS. 5 and 6 are diagrams for explaining a process when the CPU 21 (FW) issues a shutdown command due to power failure or the like in the SSD device 1 of the embodiment, especially, a process when the flash memory controller 24 receive a shutdown command from the CPU 21 (FW).

FIG. 5 illustrates the process of purging the stage processing related to a transfer request command being executed among the stages in the write operation flow illustrated in FIG. 3. FIG. 6 illustrates the process of purging the stage processing related to a transfer request command being executed among the stages in the read operation flow illustrated in FIG. 4. In the following description in connection with FIGS. 5 and 6, FIGS. 1 to 4 will be referred to as required.

As illustrated in FIGS. 5 and 6, when the CPU 21 (FW) issues a shutdown command due to power failure or the like, under the control of the CPU 21 (FW), the SSD device 1 stops receiving a command from the host device H. Further, transfer request commands queued in the command queue 241 of the flash memory controller 24 are discarded. The register 246 of the flash memory controller 24 that receives the shutdown command notifies the purge processor P of the NAND address determination module 242, the NAND controller 243, and the information update module 244 of the receipt of the shutdown command.

The purge processor P assigns a purge flag to a transfer request command currently being executed by its corresponding stage processor. Meanwhile, having received a transfer request command assigned a purge flag, the purge processor P sends it to a stage processor at the latter stage without performing the stage processing on the transfer request command. Thus, the stage processing for the transfer request command can be skipped in each of the stage processors.

Figure 7:
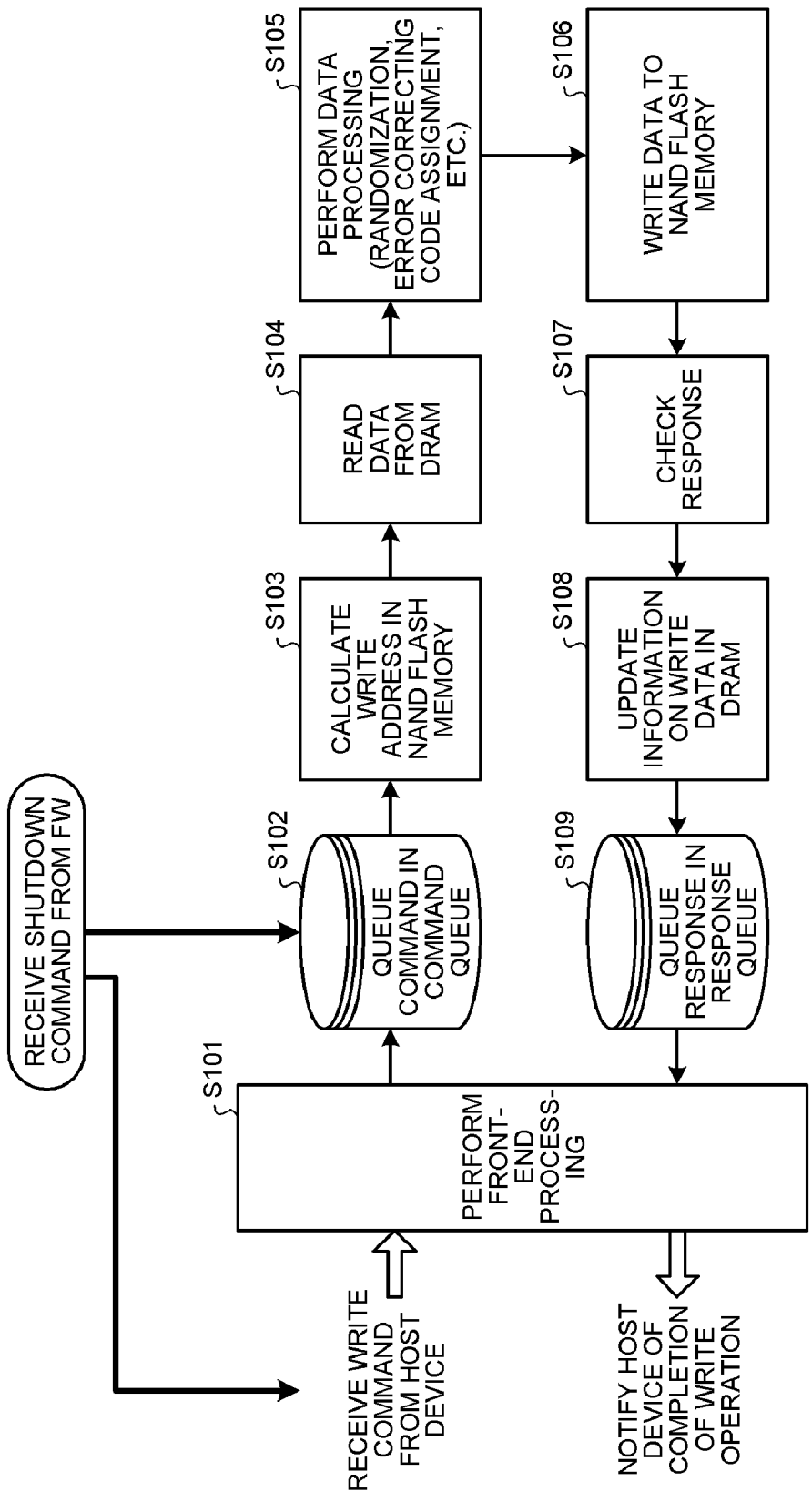

FIGS. 7 and 8 are diagrams for explaining a process when the CPU (FW) issues a shutdown command due to power failure or the like in a conventional SSD device.

FIG. 7 illustrates an operation flow when a shutdown command is issued during write operation. FIG. 8 illustrates an operation flow when a shutdown command is issued during read operation.

As illustrated in FIGS. 7 and 8, in the conventional SSD device, when the CPU (FW) issues a shutdown command due to power failure or the like, under the control of the CPU (FW), the SSD device stops receiving a command from the host device H. Further, transfer request commands queued in a command queue of a flash memory controller (not illustrated) are discarded. That is, in this process, a new transfer request command is prevented from being executed after the issuance of the shutdown command.

Then, the conventional SSD device waits for the completion of all the stage processing (S102 to S109, S202 to S207) related to a transfer request command already being executed in the flash memory controller (not illustrated). After the completion of all the stage processing, the SSD device 1 stops the circuit operation.

As described above, according to the embodiment, it is possible to reduce the time taken until the SSD device shuts down when a shutdown command is issued without complicated FW processing. Since less time is taken until the power shutdown, it is possible to reduce the power to be saved in the capacitor at an emergency shutdown due to power failure or the like. This reduces the size of the capacitor mounted on the SSD device, and thereby the SSD device can be downsized and manufactured at low cost.

More specifically, according to the embodiment, the SSD device 1 can be shut down without waiting for the completion of all stage processing related to a transfer request command being executed in the flash memory controller differently from the conventional technology. Thus, the time taken until the SSD device shuts down can be reduced compared to the conventional technology.

According to the embodiment, the purge processor P assigns a purge flag to a transfer request command at the time its corresponding stage processor completes the stage processing and sends the transfer request command to a stage processor at the latter stage. Thus, data access to a storage medium such as the DRAM 3 and the NAND flash memory 4 is not interrupted, which prevents damage to the storage medium.

While, in the embodiment, the NAND address determination module 242, the data processor 243A and the I/F controller 243B of the NAND controller 243, and the information update module 244 are described as having the purge processor P, it is not so limited. It is only required that at least one of the NAND address determination module 242, the NAND controller 243, and the information update module 244 be provided with the purge processor P. For example, only the NAND controller 243 may have the purge processor P.

Further, while the SSD controller 2 (SoC chip) of the SSD device 1 is described above as having the one CPU 21, the SSD controller 2 may comprise two or more CPUs.

While the memory control device of the embodiment is described as the SSD controller 2 (SoC chip) that controls the NAND flash memory and the memory device of the embodiment is described as the SSD device 1 comprising the SSD controller 2 (SoC chip), they are not so limited. For example, the memory control device of the embodiment may control a nonvolatile memory medium other than the NAND flash memory, and the memory device of the embodiment may comprise the other memory medium.

Still further, the hardware configuration of the SSD device, the SSD controller (SoC chip), the NAND flash memory, and the like is described above by way of example only and not limitation.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A memory control device comprising:
a controller configured to control a command for data access from a host to a nonvolatile memory;
a command queue module configured to queue a transfer request command corresponding to the command for data access;
a plurality of stage processors each configured to perform stage processing related to the transfer request command queued by the command queue module; and
a skip module provided to at least one of the plurality of stage processors which performs data access process to the non-volatile memory, the skip module being configured to assign, upon receipt of a shutdown command issued by the controller, a skip flag to the transfer request command to skip the stage processing related to the transfer request command and output the transfer request command to a stage processor at a latter stage after the stage processing at the stage processor to which the skip module is provided is completed and before the transfer request command is output to the stage processor at the latter stage, the skip module being configured to output, upon receipt of the transfer request command to which the skip flag is assigned from a stage processor at an earlier stage, the received transfer request to the stage processor at the latter stage.

2. The memory control device of claim 1, further comprising a response queue module configured to queue a response indicative of a processing result of the transfer request command skipped by the skip module.

3. The memory control device of claim 1, wherein the skip module is provided only to a stage processor configured to perform data access process with respect to the nonvolatile memory.

4. The memory control device of claim 1, further comprising a notification module configured to notify the controller of information on the transfer request command skipped by the skip module.

5. A memory device comprising:
a nonvolatile memory configured to store data;
a controller configured to control a command for data access from a host to the nonvolatile memory;
a command queue module configured to queue a transfer request command corresponding to the command for data access;
a plurality of stage processors each configured to perform stage processing related to the transfer request command queued by the command queue module; and
a skip module provided to at least one of the plurality of stage processors which performs data access process to the non-volatile memory, module being configured to assign, upon receipt of a shutdown command issued by the controller, a skip flag to the transfer request command to skip the stage processing related to the transfer request command and output the transfer request command to a stage processor at a latter stage after the stage processing at the stage processor to which the skip module is provided is completed and before the transfer request command is output to the stage processor at the latter stage, the skip module being configured to output, upon receipt of the transfer request command to which the skip flag is assigned from a stage processor at an earlier stage, the received transfer request to the stage processor at the latter stage.

6. The memory device of claim 5, further comprising a response queue module configured to queue a response indicative of a processing result of the transfer request command skipped by the skip module.

7. The memory device of claim 5, wherein the skip module is provided only to a stage processor configured to perform data access process with respect to the nonvolatile memory.

8. The memory device of claim 5, further comprising a notification module configured to notify the controller of information on the transfer request command skipped by the skip module.

9. A shutdown control method comprising:
controlling, by a controller, a command for data access from a host to a nonvolatile memory;
queuing, by a command queue module, a transfer request command corresponding to the command for data access;
performing, by each of a plurality of stage processors, stage processing related to the transfer request command queued by the command queue module; and assigning, by a skip module provided to at least one of the plurality of stage processors which performs data access process to the non-volatile memory, upon receipt of a shutdown command issued by the controller, a skip flag to the transfer request command to skip the stage processing related to the transfer request command and outputting the transfer request command to a stage processor at a latter stage after the stage processing at the stage processor to which the skip module is provided is completed and before the transfer request command is output to the stage processor at the latter stage, and outputting, by the skip module, upon receipt of the transfer request command to which the skip flag is assigned from a stage processor at an earlier stage, the received transfer request to the stage processor at the latter stage.

10. The shutdown control method of claim 9, wherein the skip module is provided only to a stage processor configured to perform data access process with respect to the nonvolatile memory.

11. The shutdown control method of claim 9, further comprising a response queue module configured to queue a response indicative of a processing result of the transfer request command skipped by the skip module.

12. The shutdown control method of claim 9, further comprising a notification module configured to notify the controller of information on the transfer request command skipped by the skip module.

* * * * *